United States Patent [19]
Peaslee et al.

[11] Patent Number: 5,255,360
[45] Date of Patent: Oct. 19, 1993

[54] DUAL PROGRAMMABLE BLOCK TEXTURING AND COMPLEX CLIPPING IN A GRAPHICS RENDERING PROCESSOR

[75] Inventors: John M. Peaslee; Jeffrey C. Malacarne, both of Chino Hills, Calif.

[73] Assignee: Hughes Aircraft Company, Los Angeles, Calif.

[21] Appl. No.: 582,696

[22] Filed: Sep. 14, 1990

[51] Int. Cl.⁵ .............................................. G06F 15/20
[52] U.S. Cl. ................................... 395/162; 395/130; 395/134; 395/141; 395/166; 345/191
[58] Field of Search ............... 395/129, 130, 133–135, 395/141–143, 162–164, 166; 340/799

[56] References Cited

U.S. PATENT DOCUMENTS

| | | | |
|---|---|---|---|
| 4,272,808 | 6/1981 | Hartwig | 395/128 |
| 4,343,037 | 8/1982 | Bolton | 395/130 |
| 4,885,703 | 12/1989 | Deering | 395/134 |
| 4,894,653 | 1/1990 | Frankenbach | 340/799 |
| 5,003,496 | 3/1991 | Hunt, Jr. et al. | 395/134 |
| 5,097,427 | 3/1992 | Lathrop et al. | 395/130 |

Primary Examiner—Dale M. Shaw
Assistant Examiner—Kee M. Tung
Attorney, Agent, or Firm—W. K. Denson-Low

[57] ABSTRACT

A block texturing and complex clip mask processor for use in a graphics rendering cogenerator. The processor provides two directly accessed texture patterns, and combinational logic for combining texture patterns and graphic primitive signals. The combined texture pattern signals and primitive signals provide for both textured graphic primitives and complex shaped clip mask areas. Also included are inputs for defining rectangular clip masks and logic means for combining the rectangularly clip masks with the texture, graphic primitive and complex clip mask signals.

12 Claims, 5 Drawing Sheets

DUAL PROGRAMMABLE BLOCK TEXTURING AND COMPLEX CLIPPING IN A GRAPHICS RENDERING PROCESSOR

CROSS REFERENCE TO RELATED APPLICATIONS

The present application is related to contemporaneously filed patent applications: Ser. No. 07/582,697, filed on Sep. 14, 1990, entitled, "Multifunction High Performance Graphics Rendering Processor," Ser. No. 07/582,709, filed on Sep. 14, 1990, entitled "Dual Hardware Channels and Context Switching in a Graphics Processor," Ser. No. 07/582,710, filed on Sep. 14, 1990, entitled "Concurrent General Purpose and DMA Processing in a Graphics Rendering Processor," Ser. No. 07/582,782, filed on Sep. 14, 1990, entitled "Integrated Area Fill, Conics and Vector Generator in a Graphics Processor", Ser. No. 07/582,696, filed on Sep. 14, 1990, entitled "Hardware Bit Block Transfer Operator in a Graphics Rendering Processor," Ser. No. 07/582,693, filed on Sep. 14, 1990, entitled "Hardware Symbology and Text Generator in a Graphics Processor," and Ser. No. 07/582,695, filed on Sep. 14, 1990, entitled "Multiprocess Scheduler in a Graphics Processor," all by John M. Peaslee and Jeffrey C. Malacarne, whose teachings are incorporated herein by reference.

BACKGROUND

The present invention relates generally to digital graphic display processors and in particular, to a hardware based dual channel block texturing and complex clipping processor for use in a graphics cogenerator.

Real time digital electronic displays are used in such applications as military command and control workstations and air-traffic control systems. In such displays, the displayed information typically comprises real-time processed data generated by a host processor which in turn receives real-time information from such devices as radars, communications equipment, and other data processors. This real-time data is combined with one or more graphic primitives, alpha-numerics, mask areas, and texture patterns to provide a comprehensive graphic display. In contemporary systems the various components of the graphics display such as primitives, mask windows, texturing and the like are provided by either a general purpose computer based graphics generator or by a hardware specific graphics generator. Of these, the general purpose graphics generators are versatile but sacrifice system performance for programmability. Hardware specific graphics generators, called cogenerators, provide good performance at the cost of programming capability. Hardware specific cogenerators are less flexible and usually require a specific system architecture for proper implementation.

Increasing demands on military command and control systems, military and civil air-traffic control system, and the like, create a need for a high performance graphics cogenerator which also provides a versatile and easily implemented programming capability. A key element in such a cogenerator is a processor that generates multiple texture patterns and defines mask windows. Such a processor is referred to as a block texturing and clip mask processor. In contemporary graphics cogenerators, block texturing and clip mask processors are typically single channel devices which require repetitive retrieval of texture patterns from a remote memory and are capable only of performing simple mask functions. It is therefore desirable to provide a block texturing and clip mask processor that is capable of performing complex mask functions, that is, masking functions, wherein mask windows are variously configured and wherein one mask window overlays another.

It is therefore and objective of the present invention to provide an improved graphics cogenerator that includes a dual block texturing and complex masking processor. It is another objective of the invention to provide a hardware based cogenerator having a very high performance block texturing and complex clip mask processor. Yet another objective of the invention is to provide a graphics cogenerator that incorporates a dual channel, hardware based block texturing and complex clipping processor. Still another objective of the invention is to provide a dual channel and complex clipping processor that provides a versatile and easily implemented programming capability.

SUMMARY OF THE INVENTION

The present invention is a block texturing and complex clip mask processor for use in a graphics cogenerator. The cogenerator includes a graphics primitive generator for generating graphics primitive signals which define graphics primitive profiles of varied configuration. The primitive generator further generates graphic primitive clip mask signals for masking signals within and without a primitive profile. A display memory is provided for receiving and storing signals and means are provided for writing graphic display signals into a bit map memory of a graphic display. The cogenerator also comprises means for generating texture pattern address and dimension signals. Control logic is provided in the block texture and complex clip mask processor for combining the graphic primitive profile, graphic primitive clip mask and texture pattern signals. The block texture and complex clip mask processor further includes means for generating rectangular clip mask coordinate signals and combinational logic means for combining the primitive, primitive clip mask, and texture pattern signals with the rectangular clip mask coordinate signals. Means are provided for outputting the combined primitive profiles, texture pattern and clip mask signals set to a display bit map memory. The rectangular clip mask portion of the processor includes means for generating a rectangular clip mask coordinate signal set.

In a specific embodiment of the invention, two texture pattern signals are directly addressed by the block texturing and clip mask processor to enable repetitive drawing of texture patterns without the need for downloading or "fetching" texture patterns from remote memory sources. The two directly accessed texture patterns can be implemented individually, combined or blanked to provide high speed rendering of up to four texture patterns. The block texturing and clip mask processor further responds to clip mask signals associated with externally generated primitive profiles including polygons, circles, ellipses, polylines, symbols, characters, rectangles and a bit block transfer generator (BITBLT) to provide texture pattern writing capability within irregular shaped areas such as polygons, ellipses and circles. Typically, the texture pattern and clip mask areas are defined as rectangular areas and the texture pattern, texture pattern address, texture pattern dimensions and rectangular clip mask dimensions and locations are easily programmed. The processor may also include means for reversing clip mask functions whereby texture patterns may be drawn internally or externally of graphic primitives. This further enables the generation of variously shaped "complex" clip masks.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
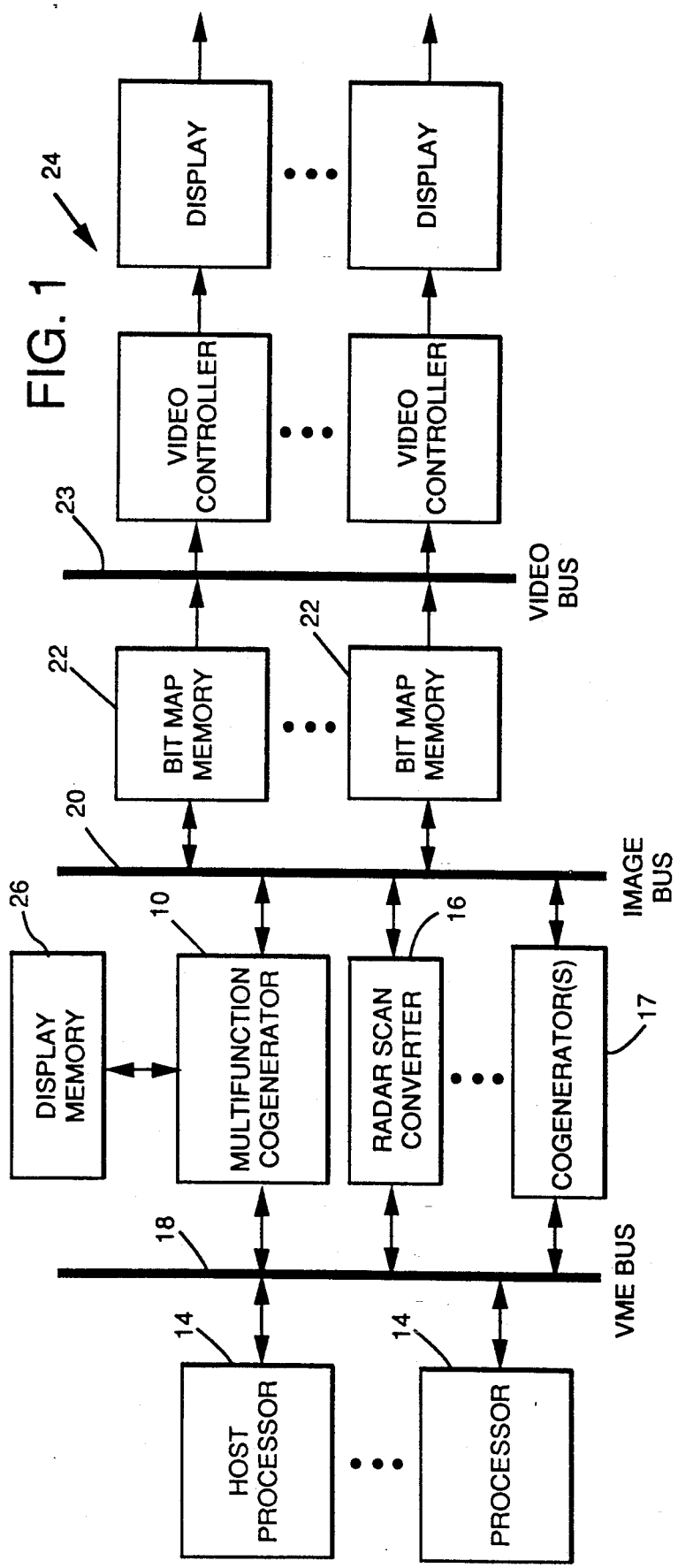
FIG. 1 is a block diagram of a generalized graphic display system including a cogenerator of which the present invention forms a part.
Figure 2:
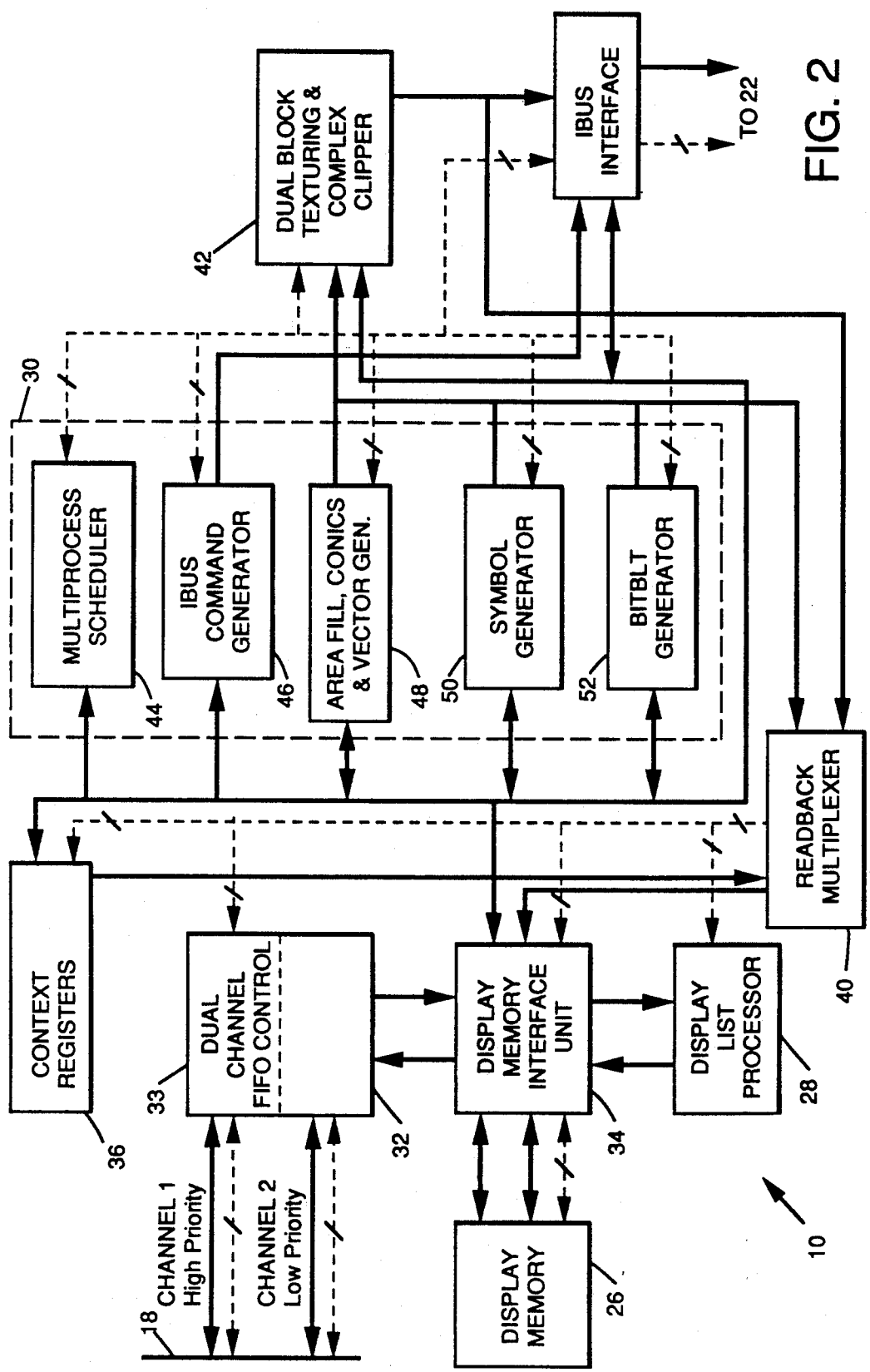
FIG. 2 is a block diagram of the cogenerator of which the present invention forms a part.

Referring to the drawings, FIG. 1 is a block diagram of a generalized graphic display system including a dual channel multifunction cogenerator 10 of which the present invention forms a part. FIG. 2 shows a block diagram of the cogenerator 10 of which a block texturing and complex clipping processor 42 of the present invention forms a functionally distinct part. The cogenerator 10 is a dual channel, hardware based device which operates in conjunction with one or more general purpose data processing systems, such as a military command and control system, wherein a simplified system is shown in FIG. 1. Briefly, the system comprises one or more real time data processors 14 and other real time data accumulating devices such as a radar system 16 and other cogenerators 17. The host processor 14 and the radar scan converter 16, for example, feed data into the cogenerator 10 via a multifunction bus 18 where it is combined with graphics data generated by the cogenerator 10. The cogenerator 10 outputs a complete set of data for generation of a graphics display via a 64-bit bidirectional interconnect image bus (IBUS) 20 into a bit map memory 22 and then by way of a video bus 23 to a display system 24. The cogenerator 10 may include various other input devices such as manual input output devices, multiple real time processors, bulk memory devices and the like.

In overview, the cogenerator 10 is a high performance single chip graphics rendering processor. It generates multiple graphics primitives and performs general purpose processing functions. The cogenerator accepts graphic commands over a thirty-two bit bidirectional host input port from a processor such as the host processor 14 of FIG. 2. The cogenerator 10 processes these commands and then draws into a bit mapped memory 22. The cogenerator 10 "draws" into the bit mapped memory 22 over the image bus 20. "Drawing" is performed by entering binary one and zero signals (drawing ones and drawing zeros herein) into individual memory locations of the bit mapped memory 22. Typically, the bit mapped memory 22 has multiple memory layers with the layers corresponding to color and intensity of graphic display pixels. The image bus 20 is a 64 bit bidirectional multi-user bus. The cogenerator can draw graphic primitives such as symbols, polylines, rectangles, circles, ellipses, arcs, polygon fills, and perform bit block transfers (BITBLT) between the cogenerator 10, the host processor 14, and the bit mapped memory 22.

Directly associated with the cogenerator 10 is a triported display memory 26. The display memory 26 stores all commands and parameters and includes appropriate logic required for the cogenerator 10 to function properly. The memory address space in a working embodiment is 4 megabytes by 32 bits. The cogenerator 10 will interface with either DRAMS, SRAMS, and/or PROMS. The display memory 26 is accessible by the cogenerator 10 display list processor 28, the cogenerator 10 internal graphics generator 30, and the host processor 14. Stored in the display memory 26 are two first in, first out (FIFO) memory buffers 32, 33, one of the buffers being assigned a higher operational priority than the other and there being one buffer memory for each of two drawing channels. An address stack is provided for each FIFO buffer 32, 33 to store subroutine calls. An attribute stack stores all internal cogenerator attributes for hardware context switching, a sin/cosine table for drawing graphics, and up to 128 font tables to draw stroked and/or dot matrix symbols and characters. A large display list region is also provided. A more detailed description of the cogenerator 10 is given in copending commonly assigned U.S. patent application Ser. No. 07/582,697, filed on Sep. 14, 1990 entitled, "Multifunction High Performance Graphics Rendering Processor," the teachings of which are incorporated herein by reference.

Figure 3:
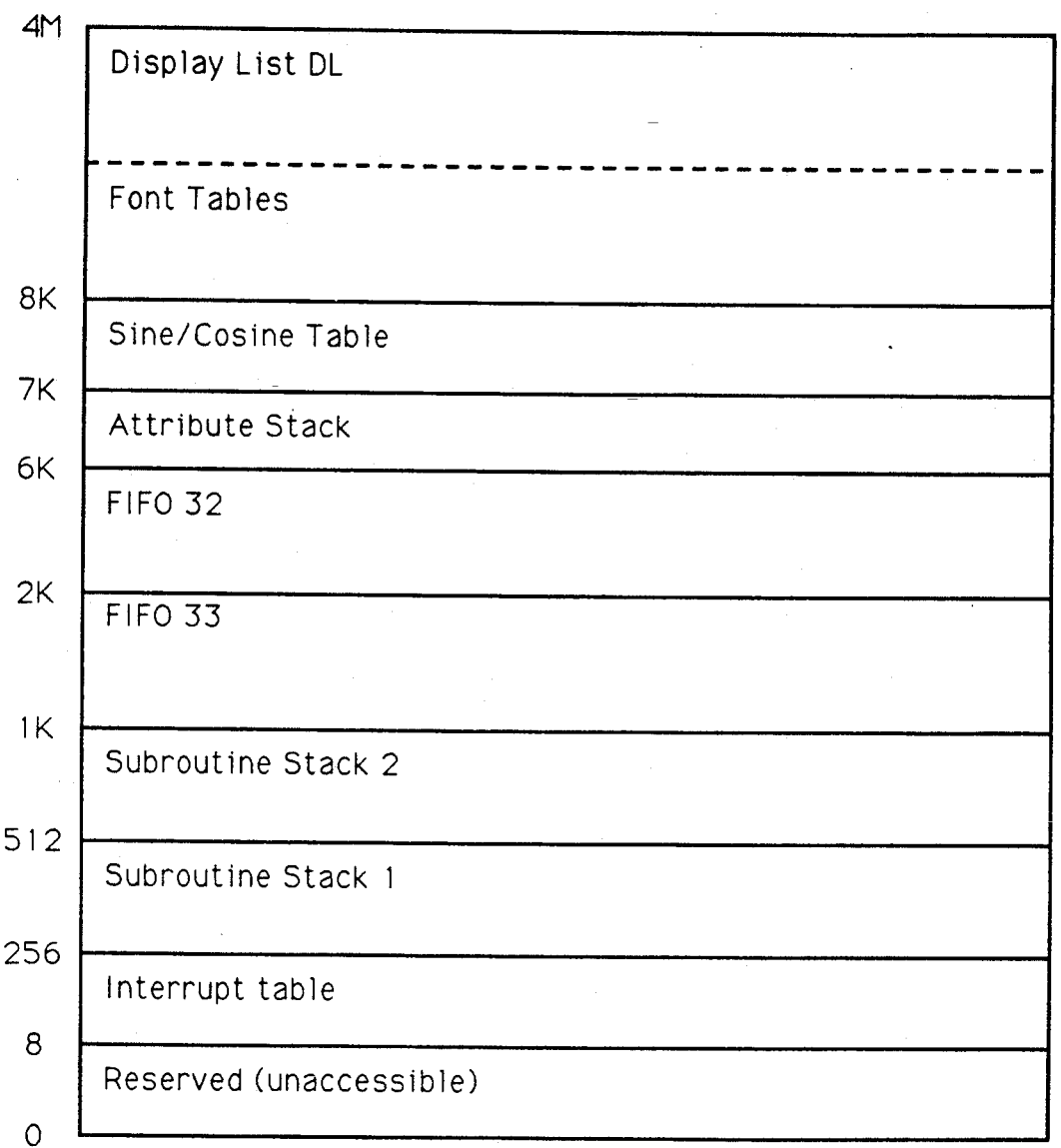
FIG. 3 is a diagram showing a general arrangement of the display memory used in the graphics cogenerator of which the present invention forms a part.

The display memory 26 is comprised of up to four million words of RAM organized as 32 bit data words and appropriate buffer logic. The contents of the display memory 26 may be organized as shown in FIG. 3. The host processor 14 has the ability to perform random reads and writes at any address within the display memory 26 address space. The cogenerator 10 monitors the input of data from the host processor 14 to the display memory 26 to synchronize updating of data from the host processor 14 with the output of graphics signals therefrom.

The dual channel FIFO buffers 32, 33 interface the cogenerator 10 to the host processor 14. The FIFO buffers 32, 33 are responsible for performing all interfacing duties such as proper "hand shaking" when the bus 18 is performing data transfers. The host processor 14 is able to both read and write to the cogenerator 10 and the display memory 26. When the host processor 14 reads or writes to the display memory 26, the FIFO buffers 32, 33 actually perform the read or write operations to the display memory 26 for the host processor 14. An address stack is provided internally within each FIFO buffer 32, 33 to store subroutine calls, an attributes stack to store all internal attributes required by the cogenerator 10 to perform hardware context switching, a sine/cosine table of drawing conics and primitives, up to 128 font tables to draw both stroked and dot matrix symbols and characters and a large display list region. The FIFO buffers 32, 33 are also responsible for arbitrating high and low priority channels to the cogenerator 10. A more detailed description of the FIFO buffers 32, 33 is given in copending commonly assigned U.S.

patent application Ser. No. 07/582,709, filed on Sep. 14, 1990 entitled "Dual Hardware Channels and Context Switching in a Graphics Processor," the teachings of which are incorporated herein by reference.

A display memory interface unit 34 performs the actual display memory 26 memory cycles. It is essentially a tri-port memory controller. The display memory 26 is used by both the host processor 14, and the cogenerator 10.

The display list processor 28 performs all of the cogenerator 10 command and display list processing. Commands are sent to the cogenerator 10 from the host processor 14. The display list processor 28 handles the various ways that commands can be sent to the cogenerator 10. The display list processor 28 interfaces to the display memory 26 using the display memory interface unit 34, reads commands from the FIFO buffers 32, 33 as well as performs other functions. When a command is given to the display list processor 28, the display list processor 28 processes the command and determines what action to take. The cogenerator 10 provides many different commands and sequences. A more detailed description of the display list processor is given in co-pending commonly assigned U.S. patent application Ser. No. 07/582,710, filed on Sep. 14, 1990 entitled "Concurrent General Purpose and DMA Processing in a Graphics Rendering Processor," the teachings of which are incorporated herein by reference.

A context register 36 stores all of the cogenerator attributes. These attributes define the current state of the cogenerator 10. The current state may include a large number of parameters such as: cogenerator operational mode; draw pointer position; foreground color; background color; clipping window dimensions; etc. The contents of the cogenerator 10 are important as they define the personality of the cogenerator 10 at any given time and all attributes are user programmable. This gives a user considerable flexibility in operating the display system.

Also provided is a readback multiplexer 40 which is a large data multiplexer. It is used to multiplex data to the display memory interface unit 34 which is directed to either the display memory 26 or back to the host processor 14 via bus 18. Three sources of readback data are the context register 36, a graphics generator 30 defined within the dashed block, and the block texturing and complex clipping processor 42 that is the subject of this disclosure. If the data is intended for the host processor 14 it will be sent through the FIFO buffers 32, 33 by the display memory interface unit 34. The graphics generator 30 is connected to the readback multiplexer for various cogenerator 10 drawing operations. The block texturing and complex clipping processor 42 also sends data to the readback multiplexer 40 for various cogenerator 10 operations.

The graphics generator 30 generates all of the cogenerator 10 primitives and symbols and performs bit block transfers (BITBLTs). The graphics generator 30 includes a multiprocess scheduler 44, an interconnect bus 20, a command generator 46, an area fill conic and vector generator 48, a symbol generator 50, and a BITBLT processor 52. The area fill, conics and vector generator 48 creates digital signals representing graphics primitives such as polylines, rectangles, circles, ellipses and polygons and area fills. These primitive signals are next combined with other digital signals representing alphanumeric and other symbols, which are generated in a symbol generator 28, and with yet a third set of signals generated by block texturing and complex clipping processor 42 to produce the final set of signals which is then transferred by the BITBLT address generator 12 into specified pixel addresses in the bit mapped memory 22. Typically, the bit mapped memory 22 has multiple memory layers which set the color and intensity for the graphics display defined for each pixel location therein.

The multiprocess scheduler 44 controls data transfers between elements of the cogenerator 10. The multiprocess scheduler 44 uses a branched scheduler approach to control the several operations and apply certain characteristics of a software operating system thereto. This promotes functional independence between various cogenerator 10 sequences and provides a mechanism for inter-unit communication.

The area fill, conic and vector generator 48 calculates mathematical solutions for drawing geometric primitives. Symbol generator 50 generates alpha numeric symbols. The BITBLT generator 52 provides a general purpose mechanism for moving rectangular blocks of image data in the bit map memory 22 and the display memory 26.

Detailed descriptions of these devices are given in copending commonly assigned U.S. patent applications Ser. No. 07/582,728, filed on Sep. 14, 1990 entitled "Integrated Area Fill, Conics and Vector Generator in a Graphics Processor", Ser. No. 07/582,696, filed on Sep. 14, 1990 entitled "Hardware Bit Block Transfer Processor", Ser. No. 07/582,693, filed on Sep. 14, 1990 entitled "Hardware Symbology and Text Generator in a Graphics Processor", and Ser. No. 07/582,695, filed on Sep. 14, 1990 entitled "Multiprocess Scheduler in a Graphics Processor," the teachings of which are incorporated herein by reference.

Figure 4:
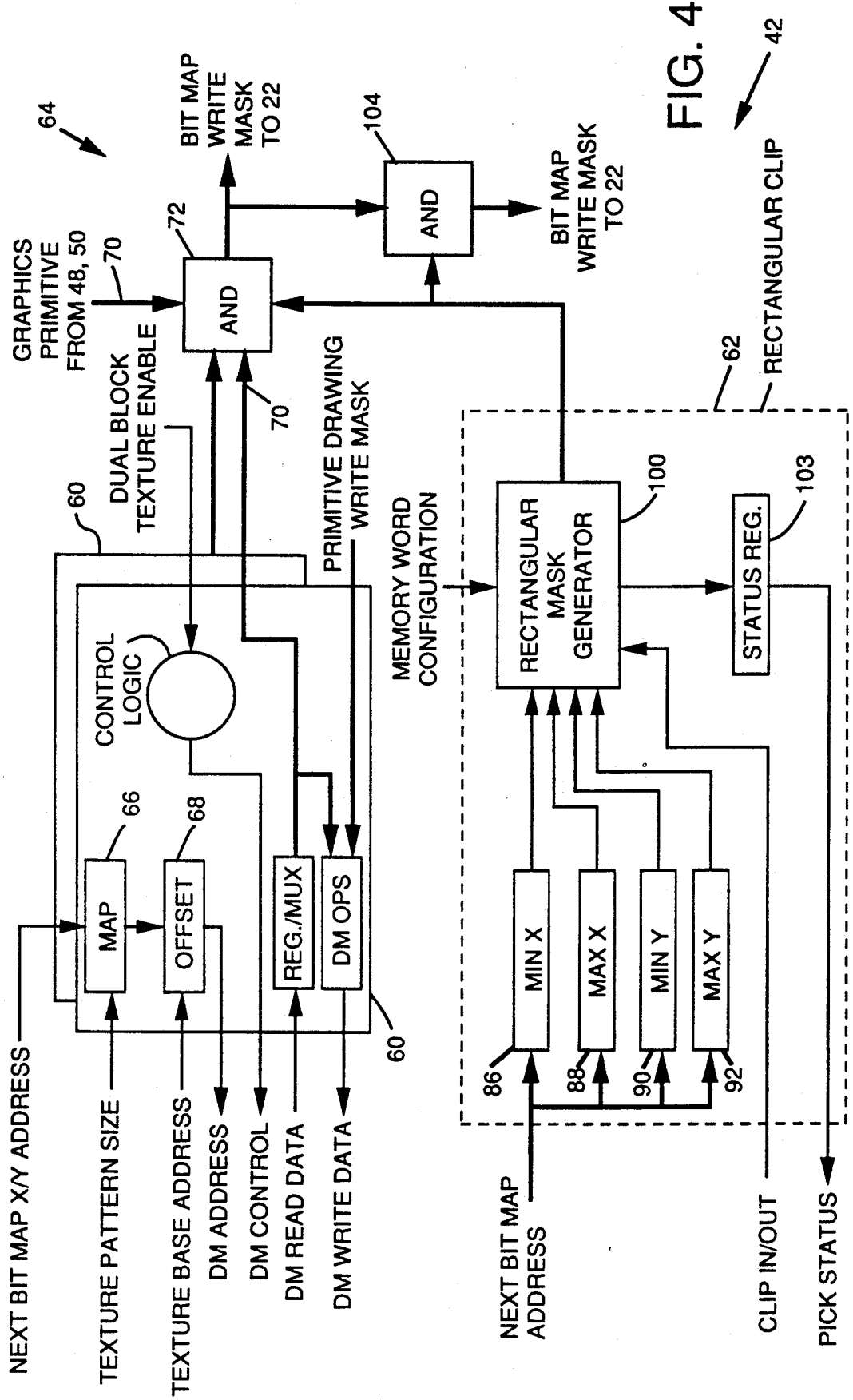
FIG. 4 is a block diagram of the block texturing and complex clipping processor of the present invention.

Referring now to FIG. 4, the block texturing and complex clipping processor 42 is shown in more detail in conjunction with related portions of the cogenerator 10. Processor 42 comprises three functional sections: a texture generating section 60, a rectangular clip section 62, and a combinational logic section 64.

Included within the texture generating section 60 is a mapping processor 66 and an address processor 68. To perform a texturing function, the next bit mapped memory 22 x, y address is applied to the map processor 66, this address being the next address in the bit mapped memory 22 to be written to by the cogenerator 10. Simultaneously, a programmable texture pattern size signal and the display memory 26 address of a desired texture pattern are entered into the mapping processor 66 and address processor 68, respectively. The texture pattern size is specified as a rectangular parameter measured in pixels and in a working embodiment must be defined as a square pattern having pixel dimensions that are multiples of 16 i.e., 16 by 16, 32 by 32.

In a working embodiment, the mapping processor 66 and the address processor 68 are provided in duplicate enabling the implementation of two texture patterns at any one time. With the texture pattern sizes and texture pattern addresses specified, the mapping processor 66 is coupled through the FIFO buffers 32, 33, display memory interface unit 34, and display list processor 28 to the appropriate address or addresses in the display memory 26 which contain the texture patterns. The display memory may contain any desired number of texture patterns. These patterns can be down loaded into the display memory 26 from the host processor 14 or otherwise programmed into the display memory 26. However, at any one time, only two texture patterns are directly addressed by the mapping function 66, this being accomplished through appropriate address pointers. The area fill, conic and vector generator 48 symbol generator 50, or BITBLT generator 52 generate all primitive profiles, area fill, and associated clip mask signals. These signals are applied via a data bus 70 to one input of an AND logic function 72 in the combinational logic function 64. The texture pattern signals are output from the display memory 26 through the display memory interface unit 34 to other inputs of the AND function 72. The result of the logical combination of primitive, primitive clip mask and texture signals by the logic function 72 is a textured primitive signal set.

If only one texture pattern is requested, the primitive or symbol will be combined with the single texture pattern. If two texture patterns have been specified, the texture patterns can be implemented separately or they can be combined. For example, if one texture pattern comprises horizontal lines and the second comprises vertical lines, these two texture patterns can be applied individually to different primitives to produce primitives having a horizontal line texture pattern and primitives having a vertical line texture pattern. The two texture patterns can also be combined. This will produce a primitive with a checkerboard textured pattern. A primitive can also be rendered with no texture pattern thereby providing up to four textures using two directly accessed texture patterns. It will be further appreciated that the outputs from the area fill, conics, and the vector generator 48 symbol generator 50 and BITBLT generator 52 include clip mask signals which negate output signals or pixel signals outside of the generated primitive. Thus, the texture pattern will appear only within the primitive or symbol.

It will further be appreciated that if the conic, vector and area fill generator 48 outputs an outline primitive, that is, a primitive that is only an outline and not a solid, the texture pattern will be applied to only this outline. For example, if the conic generator 48 generates an ellipse outline primitive, this primitive combined with a texture pattern comprising horizontal lines results in an ellipse drawn as a series of broken lines.

The cogenerator 10 has the ability to render any primitive into the display memory 26 as a series of ones or zeros. This capability enables the use of texture patterns to create arbitrarily shaped or "complex" clip masks. Complex clipping is the ability to clip images to randomly shaped regions such as circles, pie shapes, polygons, and the like as well as rectangular regions. This capability solves the problem of overlapping various randomly placed display windows on a display. Complex clipping provides a way to update non-rectangular regions in one operation.

Initially, the host processor 14 creates a texture pattern comprised of all drawing "zeros" in the display memory. Next, a drawing window comprised of all drawing "ones" is overlayed into the display memory 26. This produces a drawing window of drawing "ones" which can be logically "anded" with other drawing data, the drawing window being the area defined by the drawing "ones". The cogenerator 10 will logically combine the drawing one pattern with a selected primitive and render the combined signals into the bit mapped memory 22. This drawing sequence can be used for complex clipping purposes. For example, when the window to be updated is partially obscured by another window (or windows), a rectangular clipping shape is no longer sufficient to define the resultant overlapped clip window. This is illustrated, for example, in FIG. 5 where the display window 80 overlies the display window 82.

Figure 5:
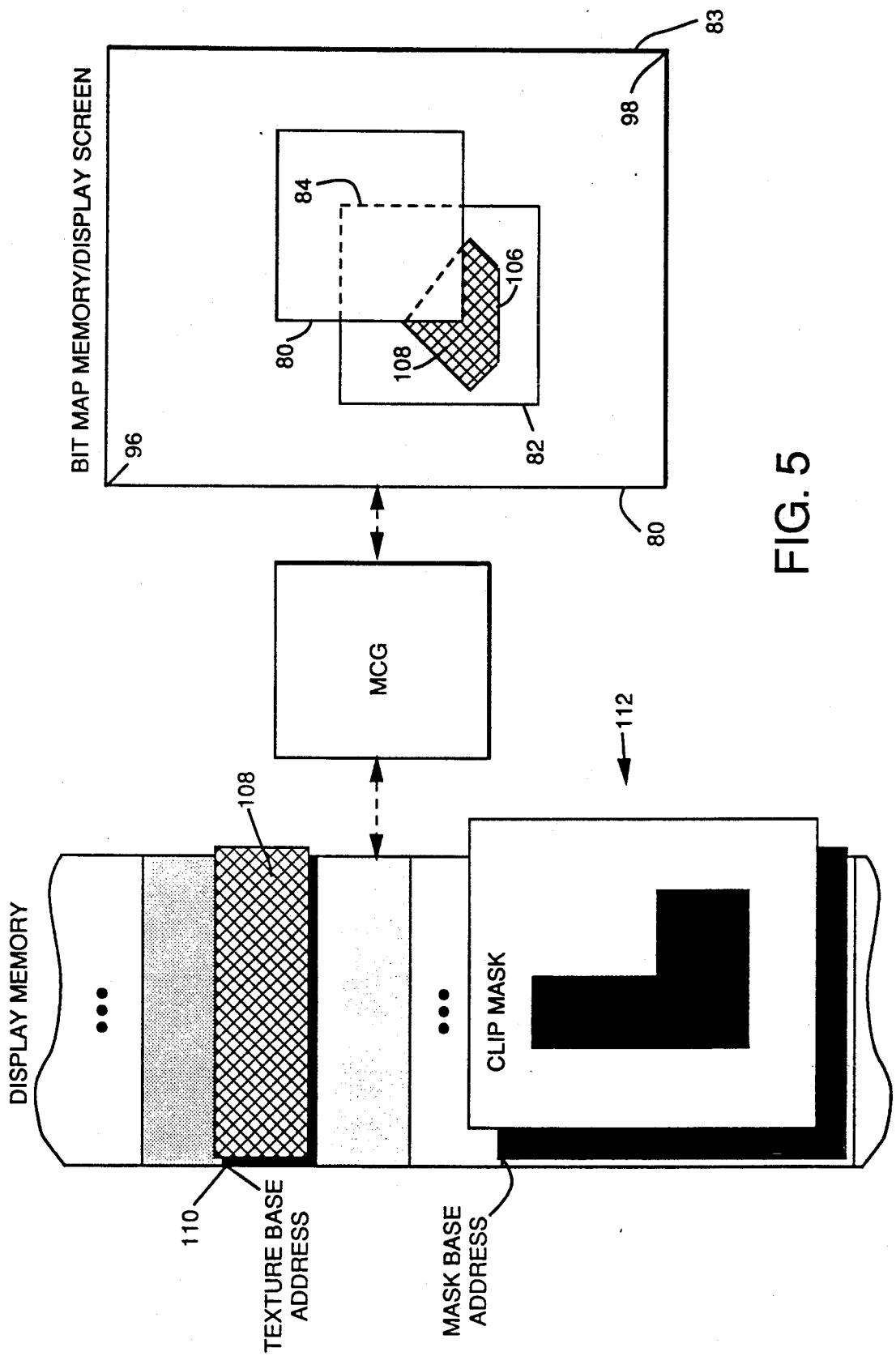
FIG. 5 is a diagram useful in explaining the various signals generated in the block texturing and complex clipping processor of the present invention.

The cogenerator 10, however, enables generation of arbitrary clipping shapes directly from the window definitions. First, the texture pattern size is defined to cover the entire screen 83 and the pattern enabled for drawing and filled with drawing zeroes. A solid rectangle that is the same size and screen position as the window 82 to be updated is rendered drawing ones into the display memory 26. Solid rectangles that are the same size and screen position as all overlapping windows 80, area 84 in FIG. 5, are then rendered as drawing zeros into the display memory 26. This erases all drawing ones in the overlapped area 84. The result is a pattern of ones that defines all pixel positions in the update window 82 that are visible on the screen, that is, the window 82 excluding the overlap area 84. This pattern can be applied by the cogenerator 10 to all drawing operations through the logic function 72 to allow the redrawing of the update window 82 without overwriting any data displayed in the overlapping area 84. Similarly, combining arbitrary primitives with a full screen texture pattern of "ones" produces an arbitrary window of ones which, combined with other drawing operations produces the arbitrarily shaped drawing window.

Another function of the block texturing and complex clipping processor 42 is rectangular clipping. The processor 42 provides two modes of rectangular clipping. These are inside clipping and outside clipping. The rectangular clip section 62 includes a set of registers 86, 88, 90, 92 used to programmably define the size and location of the rectangular clip window such as the window 80. The rectangular clip window is defined by two points, the upper left hand corner 96 and the lower right hand corner 98. This specifies the rectangular region 80 that ranges from 0 to 4,095 pixels in both the x and y directions. The cogenerator 10 automatically inputs the next bit mapped memory 22 address into the rectangular clip registers 86–92.

If rectangular clipping has been activated, a rectangular mask generator 100 controlled by the cogenerator 10, automatically clips as it draws any primitive. As the drawing address changes, the cogenerator 10 continually performs comparisons between the current bit mapped memory 22 address and x, y pixel addresses defined by the clipping window boundary. If the pixels are members of the region to be clipped (pixels inside the clip window), the cogenerator 10 will simply ignore these pixels and continue processing. If the pixels are members of the clipped region, the cogenerator 10 then writes into the bit mapped memory 22 and continues processing the primitive. It will be seen that it is possible for a drawing operation performed by the cogenerator 10 to enter and exit a clipping window multiple times. To perform this function, the rectangular clip signals output from the rectangular mask generator 100 are then combined with the textured primitive signal set output from the AND function 72 in a second AND function 104. This results in the rectangular clip window overlaying a textured primitive.

As a further feature of the invention, the clipping function and the rectangular clip functions are performed both in the conventional manner of outside clipping in which pixels exterior of a primitive are clipped or in the reverse manner of inside clipping in which pixels inside the primitive are clipped. This is effected by a programmable clip in/clip out control 102 which reverses the masking function for the rectangular clip function or by reversing the generation of drawing ones and drawing zeroes patterns as described above for complex clip windows.

To provide for "picking" the rectangular clip function further includes means for comparing primitives and clip window boundaries. As the cogenerator 10 processes a primitive and simultaneously performs rectangular clip mask functions, the cogenerator 10 determines whether a particular primitive lies within a clip window. This function can be used to automatically expand or contract clip windows to match primitive dimensions and is indicated by the output of status register 103.

Referring to FIG. 5, there is shown an example of a graphic display 83 resulting from the functions above described. The display includes a rectangular window 82, inside of which is drawn a polygon primitive 106, the primitive being an area fill primitive which is rendered with a texture pattern 108, and over which a rectangular clip window 80 is drawn. The texture pattern 108 is a texture pattern stored within the display memory 26 at a texture base address 110. The complex clip mask area 112 is a complex clip mask generated initially by applying drawing ones to the display memory 26 and then overlaying portions of the drawing ones with drawing zeros as described above.

It will be appreciated that the bit map memory 22 in working systems will typically comprise a multiple layered memory. The memory layers may be grouped by color. For example, in a twelve layer memory, four layers may correspond to red pixels, four to blue pixels, and four to green pixels. Each of the color layers is further graduated as a function of pixel intensity. A particular primitive, texture pattern, or the like will comprise not only a drawing one or a zero but a combination of ones and zeros which are mapped into the bit map memory 26 at any of the selected intensity levels for each of the colors. Bit map memories 26 ranging from 1 to as many as 24 or 36 layers have been used and it will be appreciated that the number of colors and intensities as well as the variety of the textures available with the present system are substantial.

Thus there has been described a new and improved block texturing and complex clipping processor for use with a graphics generator. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A block texturing and complex clip mask processor for use in a graphics rendering processor which includes a graphics primitive generator means for generating graphic primitive signals and graphic primitive clip mask signals defining a clip mask window for masking drawing signals within and without the clip mask window, a display memory for receiving and storing texture pattern signals at predetermined addresses that define a texture pattern, and means for writing display signals to a bit map memory of a graphic display, the block texturing and clip mask processor comprising:

means for generating and storing texture patterns comprising texture pattern dimension signals and texture pattern address signals in the display memory;

means responsive to the texture pattern address and dimension signals for directly accessing a selected stored texture pattern from the display memory;

first combinational logic means for combining the graphic primitive clip mask, signals defining an arbitrarily shaped clip mask window, the selected texture pattern, and the texture pattern dimension signals to generate an arbitrarily shaped textured graphic primitive;

means for applying the arbitrarily shaped textured graphic primitive to predetermined address locations of the bit map memory of the graphic display; and wherein two texture patterns are stored at two predetermined addresses in the display memory, and wherein the first combinational logic means includes means for combining one or both of the two texture patterns simultaneously and in sequence with the graphic primitive clip mask signals.

2. The processor of claim 1 further comprising:

means for generating rectangular clip mask coordinate signals defining a first rectangular clip mask window; and second combinational logic means for combining the textured graphic primitive and rectangular clip mask window to generate a textured graphic primitive that is masked by the rectangular clip mask window.

3. The processor of claim 2 further comprising second means for generating second rectangular clip mask coordinate signals defining a second rectangular clip mask window, and wherein the second combinational logic means includes means for combining the first and second rectangular clip mask coordinate signals and said textured graphic primitive to produce the rectangular clip mask window.

4. The processor of claim 3 further comprising means for reversing the first and second clip mask windows to produce textured display areas outside of the graphic primitive and rectangular clip mask windows, and wherein all texture pattern signals inside the graphic primitive and rectangular clip mask windows are masked.

5. The processor of claim 4 further comprising means for automatically repeating the texture pattern within boundaries of the graphic primitive when the dimensions of the graphic primitive are greater than the dimensions of the texture pattern.

6. A block texturing and complex clip mask processor for use in a graphics rendering processor which includes a graphics primitive generator means for generating graphic primitive signals and graphic primitive clip mask signals defining a clip mask window for masking drawing signals within and without the clip mask window, a display memory for receiving and storing texture pattern signals at predetermined addresses that define texture patterns, and means for writing display signals to a bit map memory of a graphic display, the block texturing and clip mask processor comprising:

means for generating a pair of texture patterns comprising texture pattern dimension signals;

means for directly accessing the pair of stored texture patterns;

combinational logic means for combining the graphic primitive clip mask signals defining the arbitrarily shaped clip mask window, and the texture pattern to generate a textured graphic primitive;

means for applying the texture graphic primitive to predetermined address locations of the bit map memory of the graphic display, and wherein two texture patterns are stored at two predetermined addresses in the display memory, and wherein the first combinational logic means includes means for combining one or both of the two texture patterns simultaneously and in sequence with the graphic primitive clip mask signals.

7. The processor of claim 6 further comprising:

means for generating rectangular clip mask coordinate signals defining a rectangular clip mask window; and second combinational logic means for combining the textured graphic primitive and rectangular clip mask window to generate a textured graphic that is masked by the rectangular clip mask window.

8. The processor of claim 7 further comprising means for reversing the first and second clip mask windows to produce textured display areas outside of the graphic primitive and rectangular clip mask windows, and wherein all texture pattern signals inside the graphic primitive and rectangular clip mask windows are masked.

9. The processor of claim 8 further comprising means for automatically repeating the texture pattern within boundaries of the graphic primitive when the dimensions of the graphic primitive are greater than the dimensions of the texture pattern.

10. A block texturing and complex clip mask processor for use in a graphics rendering processor which includes a graphics primitive generator means for generating graphic primitive signals and graphic primitive clip mask signals defining a clip mask window for masking drawing signals within and without the clip mask window, a display memory for receiving and storing texture pattern signals at predetermined addresses that define texture patterns, and means for writing display signals to a bit map memory of a graphic display, the block texturing and clip mask processor comprising:

means for generating a pair of texture patterns comprising texture pattern dimension signals;

means for directly accessing the pair of stored texture patterns;

first combinational logic means for combining the graphic primitive clip mask signals defining the arbitrarily shaped clip mask window, and the texture pattern to generate a textured graphic primitive;

means for applying the texture graphic primitive to predetermined address locations of the bit map memory of the graphic display;

means for generating rectangular clip mask coordinate signals defining a pair of rectangular clip mask windows;

second combinational logic means for combining the textured graphic primitive and rectangular clip mask windows to generate a textured graphic that are masked by the rectangular clip mask windows; and wherein the first combinational logic means includes means for combining one or both of the two texture patterns simultaneously and in sequence with the graphic primitive clip mask signals.

11. The processor of claim 10 further comprising means for reversing the first and second clip mask windows to produce textured display areas outside of the graphic primitive and rectangular clip mask windows, and wherein all texture pattern signals inside the graphic primitive and rectangular clip mask windows are masked.

12. The processor of claim 11 further comprising means for automatically repeating the texture pattern within boundaries of the graphic primitive when the dimensions of the graphic primitive are greater than the dimensions of the texture pattern.

* * * * *